(No Model.)
A. P. & F. M. BAKER.
SPRINKLING CAN.
No. 453,530. Patented June 2, 1891.
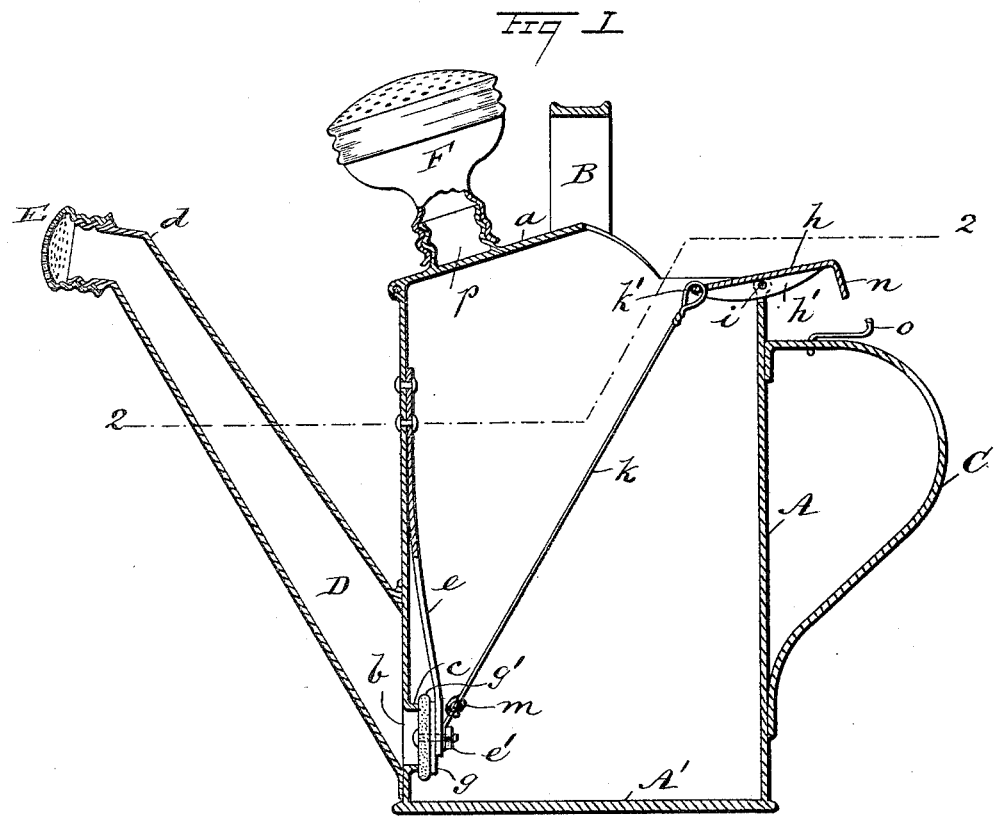
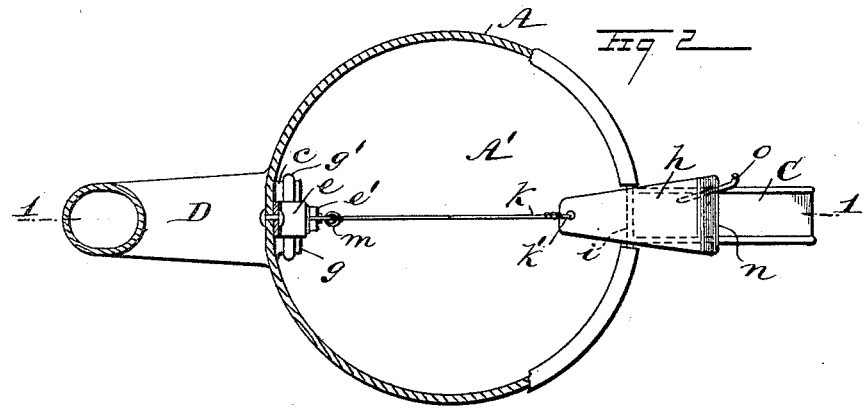
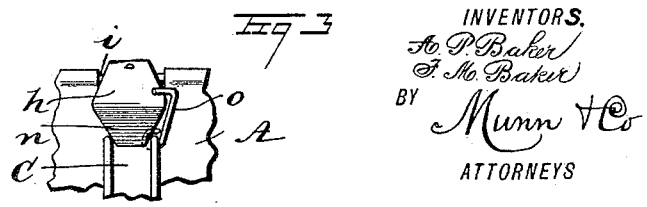
WITNESSES:
H. Walker
E. M. Clark
INVENTORS.
A. P. Baker
F. M. Baker
BY Munn & Co
ATTORNEYS

UNITED STATES PATENT OFFICE.

ALEXANDER P. BAKER AND FRANCIS M. BAKER, OF EMPIRE, WISCONSIN.

SPRINKLING-CAN.

SPECIFICATION forming part of Letters Patent No. 453,530, dated June 2, 1891.

Application filed September 1, 1890. Serial No. 363,585. (No model.)

*To all whom it may concern:*

Be it known that we, ALEXANDER P. BAKER and FRANCIS M. BAKER, both of Empire, in the county of Fond du Lac and State of Wisconsin, have invented a new and useful Sprinkling-Can, of which the following is a full, clear, and exact description.

This invention relates to an improved sprinkling device for the spraying of fluids on plants or shrubbery, and has for its objects to provide a simple, inexpensive, and convenient utensil, which will afford means for the economical distribution of poisoned solutions on plants and bushes, to destroy insects or their lice or eggs, and in the same device afford means for the speedy conversion of the same into a water-sprinkler.

To these ends our invention consists in the construction and combination of parts, as is hereinafter described, and indicated in the claims.

Reference is to be had to the accompanying drawings, forming a part of this specification, in which similar letters of reference indicate corresponding parts in all the figures.

Figure 1 is a side elevation in section taken on the line 1 1 in Fig. 2. Fig. 2 is a plan view, partly in section, taken on the broken line 2 2 in Fig. 1; and Fig. 3 is an elevation of a broken portion of the can-body near the upper edge, with the upper portion of the attached handle and a pivoted rocking lever on the can-body loosely secured to the handle by a latch-hook.

The body A of the sprinkling-can, that is designed to contain the liquid which is to be distributed, is preferably formed of sheet metal, cylindrical in cross-section, and of proper diameter and height, which may be varied as may be desired. The top side of the can-body A is provided with a sheet-metal cover $a$, that is secured thereon to prevent a slopping discharge of contained liquid over the forward edge of the can when in use, said cover being extended over about one-half of the can-body from the front edge toward the handle B.

The can-body A is furnished with two handle attachments B and C. The first named is in bail form, and is attached in the usual manner by its ends to the upper edge of the can-body at opposite points, thus affording means for the transportation of a filled can in a convenient manner. The other handle C is secured to the side of the can-body opposite the pouring-spout D, and is designed to facilitate the decanting of liquid from the can-body A through said spout.

Near the bottom A' of the can-body A, in the same vertical plane with the handle C and opposite the latter, a perforation $b$ of proper diameter is formed in the vertical wall of the can, which aperture $b$ is produced by a proper punching implement that will form a circular perforation from the outside inwardly, and at the same time produce an integral inwardly-projecting border-flange $c$.

The can-spout D is tubular and projects upwardly and outwardly from its point of connection with the vertical wall of the canbody A and over the aperture $b$. There is a bend formed at $d$ near the upper terminal end of the spout D, thus projecting the nose of the spout forwardly from said point, and upon this nozzle portion a screw-thread is formed on the outer surface of the same for the removable attachment of sprinkling devices.

As the economical distribution of a poisonous liquid suitable for the extermination of insect vermin which infest plants and shrubbery is one of the objects of this invention, a small rose-nozzle or perforated cap-piece E is preferably employed, which is adapted to fit upon the threaded end portion of the spout D, as shown in Fig. 1.

On the interior of the can-body A, in vertical alignment with the flange $c$, a spring $e$ is secured to the vertical wall of the can by its upper end, the depending portion of said spring having a proper bend given to it, so that its lower end may engage the disk valve $g$, to which the spring end is secured by a small bolt $e'$ or other means. The length of the spring $e$ is so proportioned as to locate the valve $g$ concentric with and upon the free edge of the circular flange $c$, the resilience of the spring normally retaining the valve seated upon said flange, so as to close the aperture leading from the can-body to the spout D. The disk valve $g$ is preferably constructed of a rounded metallic plate having a gum or leather facing $g'$, which, being slightly pliable, will allow the thin edge of the flange c to embed in it, and thus form a tight joint.

Above the lateral handle C, which is located a proper distance from the top edge of the can-body A, a rocking lever h is pivoted near its center of length. Said lever h is preferably formed of plate metal, and is provided with opposite depending flanges h', that are oppositely perforated to permit the lever to be loosely mounted upon the stiffening border wire i, which encircles the top edge of the can-body, and is thus supported free to rock from a horizontal plane. The inner end of the lever h is loosely connected at k' to the rod k, which extends downward and forward toward the disk valve g, to which said connecting-rod is loosely jointed by a hook-and-eye connection, as at m, or other equivalent means. The length of the connecting-rod k is so proportioned that when the valve g is seated on the flange c the lever h will be slightly elevated at its outer end above the inner end of the same, there being a depending end portion or toe n bent on the lever h of a correct length to gage the opening of the disk valve g by an impinging contact of the lower end of the toe n on the upper surface of the handle C.

In using the device to sprinkle a poisonous solution upon plants, vines, or shrubs the can is filled with water impregnated with such insect-poisons as paris-green, London purple, or other preferred material that will destroy bugs, flies, worms, or aphides. The can is then carried along a row or from shrub to shrub, the valve g being opened by the depression of the outer end of the lever h by the thumb of the operator, the construction of the utensil affording means to control the distribution of the liquid, so that only such plants or bushes as are infested by the vermin will be sprinkled.

If the device is to be adapted for use as an ordinary water-sprinkling can, the larger rose-nozzle or perforated cap-piece F is placed on the spout D, and the lever h is held in depressed adjustment to retain the valve g, lifted from its seat by a hooked engagement of the latch-hook o with the outer end of the lever, as shown in Fig. 3.

As a convenient means for retaining the spare nozzle in connection with the can-body, and so prevent its loss, there is a threaded nipple p, secured upon the cover a, whereon the detached rose-nozzle E or F may be placed when not in service as a sprinkler, either being available as occasion may require.

Having thus described our invention, we claim as new and desire to secure by Letters Patent—

1. The combination, with a can-body, a bail-handle, a lateral pouring-handle, and an inclined tubular spout opposite the pouring-handle and attached to the can-body over a circular inwardly-flanged aperture in the wall of the can, of an elastic-faced disk valve which seats on this flanged aperture, a depending plate-spring that holds the valve normally seated, a rocking lever pivoted on the edge of the can-body above the pouring-handle, a hook to hold this lever depressed at its outer end, a connecting-rod between the inner end of the lever and the disk valve, and a rose-nozzle, substantially as set forth.

2. The combination, with a can-body having a spout at the front thereof and a handle at the back, of a plate-spring secured to the vertical wall of the can-body and carrying a valve that normally effects a closure of the inner end of the spout, a rocking lever secured to the upper end of the can-body at the back thereof above the handle, and a connecting-rod extending from the said rocking lever diagonally across the can and connected with the valve, substantially as described.

ALEXANDER P. BAKER.
FRANCIS M. BAKER.

Witnesses:
T. S. McGAULEY,
MAURICE McKENNA.